Figure 1:
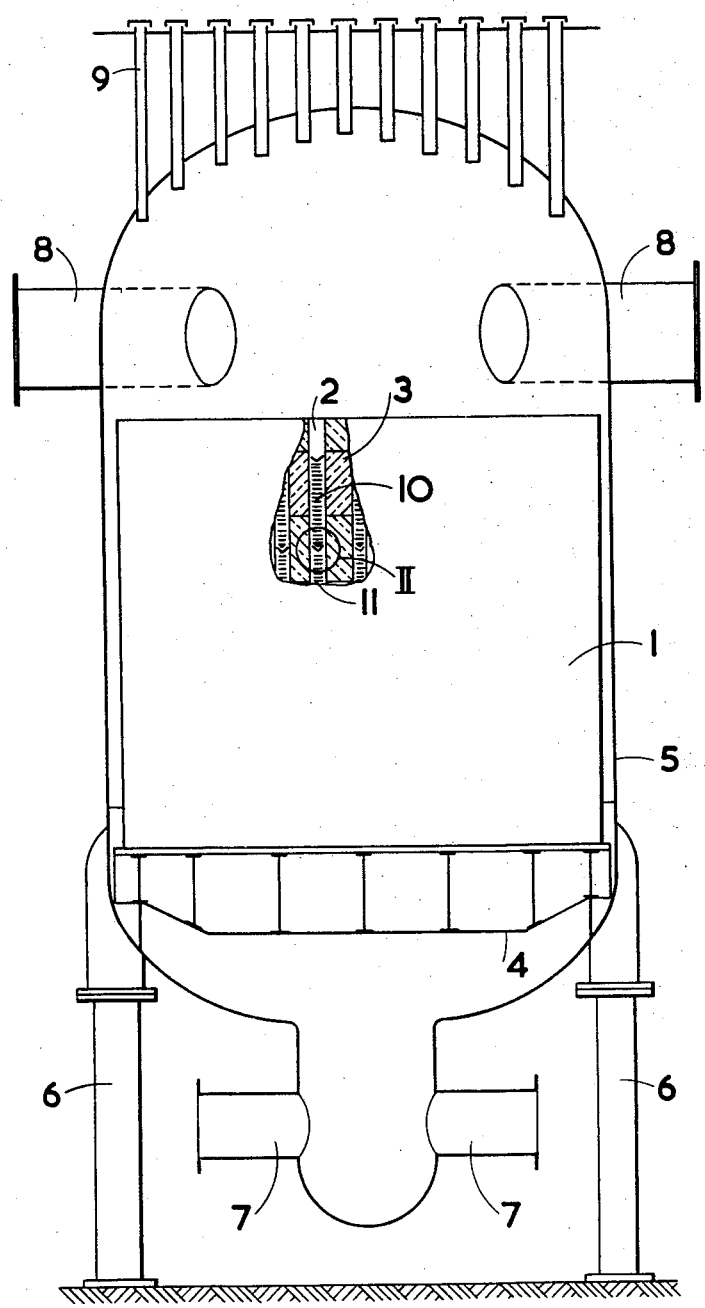

Sept. 29, 1964 L. M. WYATT 3,151,035
NUCLEAR REACTOR FUEL ELEMENTS
Filed July 7, 1959 2 Sheets-Sheet 1

FIG.I

INVENTOR
LESLIE MARK WYATT
BY

Sept. 29, 1964    L. M. WYATT    3,151,035
NUCLEAR REACTOR FUEL ELEMENTS
Filed July 7, 1959    2 Sheets-Sheet 2

INVENTOR
LESLIE MARK WYATT

BY *Lawson and Taylor*

3,151,035
NUCLEAR REACTOR FUEL ELEMENTS
Leslie Mark Wyatt, Appleton, England, assignor to United Kingdom Atomic Energy Authority, London, England
Filed July 7, 1959, Ser. No. 825,441
Claims priority, application Great Britain July 22, 1958
3 Claims. (Cl. 176—53)

This invention relates to nuclear reactor fuel elements of the kind comprising a fuel member enclosed in a protective sheath and adapted to be assembled with similar fuel elements in rows or columns.

It has been proposed (see for example British Patent No. 779,408) that fuel elements of the kind described should include discs of heat insulating, low neutron absorbing material between the ends of the fuel members and the ends of the protective sheath in order to prevent excessive heat transfer into members between the fuel elements, such as locating cones, which are not very effectively cooled, so that when stressed, such members do not creep excessively.

However, it is found that the existence of spaces between adjacent fuel elements in a row or column leads to a phenomenon known as "neutron-flux peaking." While this phenomenom is not fully understood its operation could be considered as an affinity of neutrons for the fuel members rather than diffusion uniformly about the space between the fuel members, so that the flux increases where the fuel members end and space (as considered from a neutron viewpoint) begins. This flux peaking can give rise to increased fission at the ends of the fuel elements, and, with the difficulty of cooling the ends of fuel elements, substantially increased temperatures. These increased temperatures may well be the dominating factor in resolving the maximum temperature of the coolant discharged from the reactor and accordingly methods of reducing these temperatures are regarded as advantageous and it is to this end the present invention is directed.

According to the present invention a fuel element of the kind comprising a fuel member enclosed by a protective sheath, adapted to be assembled with similar fuel elements in end to end relationship in rows or columns is characterised in that at least one end of the fuel member is terminated with breeder material. The word "breeder material" is intended to cover material which is capable of absorbing neutrons to create fissile material, but is lower in fissile material concentration than that of the fuel member which it terminates. Uranium depleted in the 235 isotope relative to the fuel member is one example of "breeder material." Thorium is another example.

It is preferred that the breeder material is joined securely to the fuel member by welding or keying and that the assembly of breeder and fuel offers an overall smooth surface which will remain smooth with thermal and irradiation expansions. If the breeder and fuel material are loosely joined there is a risk that one may expand more than the other to create a step which would cause high stress concentrations in the sheath. Where the fuel member is tubular, welding is much preferred as it ensures that leakage of the sheath will not allow coolant gas to reach the inside of the fuel member which is hotter than the outside and where the oxidation rate will be correspondingly higher and probably more difficult to detect.

While breeder material in metallic form is also preferred it is envisaged that oxides and other refractory forms may be used where large heat transfer to end fittings of the fuel element has to be avoided. In addition to the breeder material heat insulating washers or discs may also be added. When possible, finning on the sheath is taken to a region which also includes the breeder material region of the fuel element. The breeder material may be in the form of a stack of oxidised metal discs to avoid heat transfer to end fittings.

Figure 2:
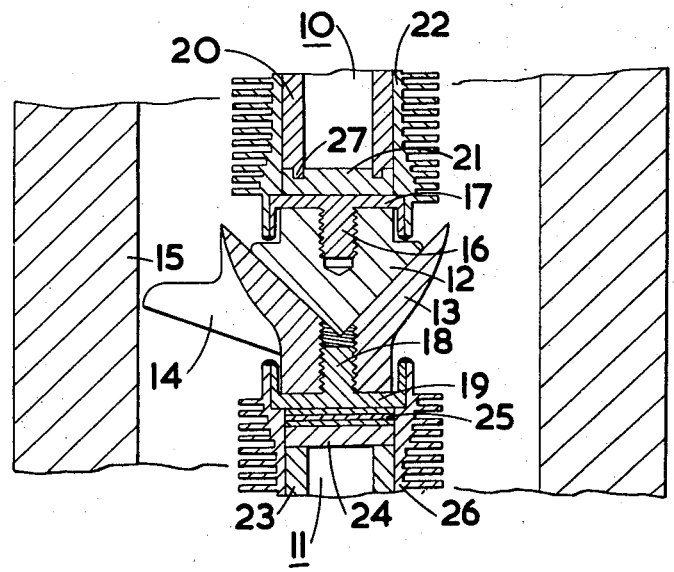

The invention will now be further described by way of example with reference to the accompanying drawings in which FIG. 1 is a diagrammatic sectional view of a nuclear reactor and FIG. 2 is an enlarged view of the part marked by the circle II in FIG. 1.

In FIG. 1 a reactor (like that described for example in U.S.P. 2,863,815) has a graphite moderator structure 1 with fuel element channels 2 equipped with fuel elements like those numbered 10, 11. The structure 1 is assembled from bricks 3 and it is carried on a grid 4 in a pressure vessel 5 carried on supports 6. The pressure vessel has coolant inlet ducts 7 and outlet ducts 8. Stand pipes 9 are provided giving access to the vessel for refuelling and for the storage of control rod operating mechanism.

FIG. 2 shows two fuel elements 10 and 11, the top end of the lower element 11 and the bottom end of the upper element 10 only being shown. The elements 10 and 11 are stacked vertically one upon the other and located by a cone 12 in a conical cup 13 having a spider arm 14 (one of three) reaching out to a channel wall 15. The cone 12 is screw fitted to a stud 16 attached to a magnesium alloy end cap 17 on the element 10 and the cup 13 is screw fitted to a stud 18 attached to a magnesium alloy end cap 19 on the element 11. The fuel element 10 consists of a tubular uranium (natural) fuel member 20 and a uranium (depleted) fuel cap 21 enclosed in a finned magnesium alloy sheath 22 and the end cap 17. The fuel element 11 consists of a tubular uranium (natural) fuel member 23 and, a uranium (depleted) fuel cap 24 and mica discs 25 enclosed in a finned magnesium alloy sheath 26 and the end cap 19. The fuel member 20 has an extended part 27 fitting into a recess in the fuel cap 21.

The fuel elements 10 and 11 are shown in different forms to illustrate different forms of the invention.

In the fuel element 10, the fuel cap 21 is of breeder material (uranium depleted in the isotope 235 to a concentration of 0.6 Co) and the extended part 27 keys the member 20 to the fuel cap 21 thus reducing the likelihood of a step occurring where the member 20 and cap 21 meet.

In the fuel element 11, the fuel cap 24 is also of the same breeder material as the cap 21 and is flash butt welded to the fuel member 23 and ground smooth on the rim of the weld. The discs 25 are shown providing additional heat insulation to prevent the end cap 19 becoming overheated. The discs 25, which are stated above to be of mica, could be replaced for example with oxidised discs of breeder material and the cap 24 could be dispensed with. The fuel members could be uranium metal or a refractory uranium compound such as uranium dioxide.

Typical dimensions are 3.8 cms. outside diameter for the fuel members 20, 23, with a wall thickness of 6.5 mm. and a thickness of 6.5 mm. for the fuel caps 21, 24.

In the operation of the fuel elements described above in a nuclear reactor there will be tendency for the neutron flux to concentrate at the ends of the fuel numbers 20, 23, but much of the concentration will make itself felt in the caps 21, 24 of breeder material and while it will increase the fission in the caps (which is low anyway) it will not give rise to such substantial temperature increases as would be the case if natural uranium were exposed to the same flux. Only a part of the neutron flux will cause fission and hence heat, the other part of the flux will be captured to give plutonium which can be usefully extracted from the fuel cap at the end of its irradiation.

Fuel elements having ends of breeder material are not in themselves novel, such elements being known, for example, from British Patent No. 778,881 which discloses fuel elements as used in the Dounreay fast reactor. However such elements have fuel members of highly enriched material and large tubular pieces of breeder material and are not adapted for assembly with similar fuel elements in end to end relationship in rows or columns. In such elements the breeder material is provided for the express purpose of generating fissionable material and thus provide for a gain in fissionable atoms in the reactor as a whole.

In the invention described above the breeder material is provided for the prime purpose of reducing neutron flux peaking and therefore provides opportunity for an improved outlet temperature from the reactor while not seriously affecting the nuclear behaviour of the reactor.

I claim:

1. In a gas-cooled nuclear reactor having a graphite moderator penetrated by vertical fuel channels, the improvement of a stack of like nuclear fuel elements in each channel, each element in the stack comprising a massive metal nuclear fuel member of elongate form, an elongate protective shield of low neutron cross absorption characteristic enclosing the fuel member, end locating closure members closing the ends of the protective shield, and disc-shaped members of breeder material at both ends of the fuel member and disposed between the respective ends of the fuel member and end closure members to reduce neutron flux concentration in the space between the respective fuel member ends and the fuel member ends of adjacent fuel elements in the stack, the members of breeder material being in contact with the respective ends of the fuel members and having outer dimensions equal to the outer dimensions of the respective ends of the fuel member to be coextensive therewith.

2. The improvement according to claim 1 wherein the fuel member comprises an elongate hollow tube and the disc-shaped members of breeder material form end caps therefor.

3. The improvement according to claim 1 wherein the disc-shaped members of breeder material are keyed to the fuel member to enable the same radial expansion of both the breeder material and the fuel member.

References Cited in the file of this patent

UNITED STATES PATENTS

| | | |
|---|---|---|
| 2,798,848 | Kingdon | July 9, 1957 |
| 2,799,642 | Hurwitz et al. | July 16, 1957 |
| 2,863,815 | Moore et al. | Dec. 9, 1958 |
| 2,864,758 | Shackelford | Dec. 16, 1958 |
| 2,885,335 | Moore et al. | May 5, 1959 |
| 2,952,603 | Boller et al. | Sept. 13, 1960 |
| 3,022,240 | Bassett | Feb. 20, 1962 |

FOREIGN PATENTS

| | | |
|---|---|---|
| 790,389 | Great Britain | Feb. 5, 1958 |